(12) United States Patent
Robinson et al.

(10) Patent No.: US 8,538,152 B2
(45) Date of Patent: Sep. 17, 2013

(54) SYSTEM AND METHOD TO ENABLE CORRECTION OF TEXT HANDLING MISMATCHES VIA SEGMENTATION

(75) Inventors: David Robinson, Penfield, NY (US); Katherine Loj, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 198 days.

(21) Appl. No.: 13/230,428

(22) Filed: Sep. 12, 2011

(65) Prior Publication Data

US 2013/0063466 A1   Mar. 14, 2013

(51) Int. Cl.
*G06K 9/34* (2006.01)

(52) U.S. Cl.
USPC ........... 382/173; 382/112; 382/164; 382/177; 358/537; 358/538; 358/453

(58) Field of Classification Search
USPC ......... 382/112, 164, 165, 171, 177; 358/537, 358/538, 540, 453
See application file for complete search history.

(56) References Cited

U.S. PATENT DOCUMENTS

| | | | |
|---|---|---|---|
| 5,293,430 A | 3/1994 | Shiau et al. | |
| 6,181,829 B1 | 1/2001 | Clark et al. | |
| 6,347,153 B1 | 2/2002 | Triplett et al. | |
| 6,738,152 B1 * | 5/2004 | Roth et al. | 358/1.14 |
| 6,895,126 B2 * | 5/2005 | Di Bernardo et al. | 382/284 |
| 7,546,602 B2 * | 6/2009 | Hejlsberg et al. | 719/313 |
| 7,577,316 B2 * | 8/2009 | Di Bernardo et al. | 382/305 |
| 7,844,118 B1 | 11/2010 | Li et al. | |
| 8,027,513 B2 * | 9/2011 | Leichter et al. | 382/103 |
| 2006/0269132 A1 | 11/2006 | Metcalfe et al. | |

OTHER PUBLICATIONS

Brochure on Specifications for Color 800/1000 Presses, Fuji Xerox, 2010, 16 pages.
U.S. Appl. No. 13/230,453, filed Sep. 12, 2011, David Robinson.

* cited by examiner

*Primary Examiner* — Yosef Kassa
(74) *Attorney, Agent, or Firm* — Pillsbury Winthrop Shaw Pittman, LLP

(57) ABSTRACT

Disclosed is a processor-implemented method for processing image data using an image processing apparatus. The processor is configured to receive a PDL file of image data and raster image process (RIP) the PDL file to determine at least pixels representing text of a predetermined colorant. The ripped file is then segmented to determine at least any text pixels of the predetermined colorant not initially indicated by the ripped file. The results are combined to determine text pixels of the predetermined colorant for marking onto a substrate using marking material (e.g., ink). In some instances, pixels of the predetermined colorant can be tagged during segmenting using a tag plane to determine text pixels for marking by the output device.

30 Claims, 5 Drawing Sheets

SYSTEM AND METHOD TO ENABLE CORRECTION OF TEXT HANDLING MISMATCHES VIA SEGMENTATION

FIELD

This application generally relates to digital image processing, and in particular, to a system and method for identifying pixels representing text in printed documents to improve image quality.

BACKGROUND

Output devices, such as multi-function printers or devices (MFDs), are becoming quite complex and deal with sophisticated concurrent operations. During a print job or copy job, these devices may encounter problems while processing pixels of image data, including identifying all of the pixels representing more intricate details, such as text. This can affect image quality of the document when marking and outputting.

Such problems can occur when processed image data is sent for output. For example, each pixel of image data representing text may not be identified when page description language (PDL) image data is sent for rasterizing and output. Thus, the raster image may have mismatched text data (e.g., as compared to the electronic file) and can produce low density or even unmarked pixels marked on a page, resulting in skipped, hole ridden, and/or low quality text in the printed document.

SUMMARY

One aspect of the disclosure provides a processor-implemented method for processing image data using an image processing apparatus. The image processing apparatus has at least one processor for processing documents containing image data having a plurality of pixels. The method includes the following acts implemented by the at least one processor:
receive a page description language file of image data including a plurality of pixels and related image instructions;
raster image processing the page description language file to create a bitmap file with a first data structure indicating at least pixels representing text of a predetermined colorant;
segmenting the bitmap file to determine at least pixels in the bitmap file representing text of the predetermined colorant not indicated in the first data structure to form a second data structure, and
combining the first data structure and the second data structure to form a third data structure indicating text pixels of the predetermined colorant for marking onto a substrate using an image output device.

Another aspect of the disclosure provides a system for processing image data having a plurality of pixels. The system has at least one processing element with an input and an output and is configured to receive and process pixels of the image data. The at least one processing element is configured to:
receive a page description language file of image data including a plurality of pixels and related image instructions;
raster image process the page description language file to create a bitmap file with a first data structure indicating at least pixels representing text of a predetermined colorant;
segment the bitmap file to determine at least pixels in the bitmap file representing text of the predetermined colorant not indicated in the first data structure to form a second data structure, and
combine the first data structure and the second data structure to form a third data structure indicating text pixels of the predetermined colorant for marking onto a substrate using an image output device.

Yet another aspect of the disclosure provides a non-transitory computer readable medium having stored computer executable instructions, wherein the computer executable instructions, when executed by a computer, direct a computer to perform a method for processing image data, the method includes: receiving a page description language file of image data including a plurality of pixels and related image instructions;
raster image processing the page description language file to create a bitmap file with a first data structure indicating at least pixels representing text of a predetermined colorant;
segmenting the bitmap file to determine at least pixels in the bitmap file representing text of the predetermined colorant not indicated in the first data structure to form a second data structure, and
combining the first data structure and the second data structure to form a third data structure indicating text pixels of the predetermined colorant for marking onto a substrate using an image output device.

Other features of one or more embodiments of this disclosure will seem apparent from the following detailed description, and accompanying drawings, and the appended claims.

BRIEF DESCRIPTION OF THE DRAWINGS

Embodiments of the present disclosure will now be disclosed, by way of example only, with reference to the accompanying schematic drawings in which corresponding reference symbols indicate corresponding parts, in which.

DETAILED DESCRIPTION

Figure 1:
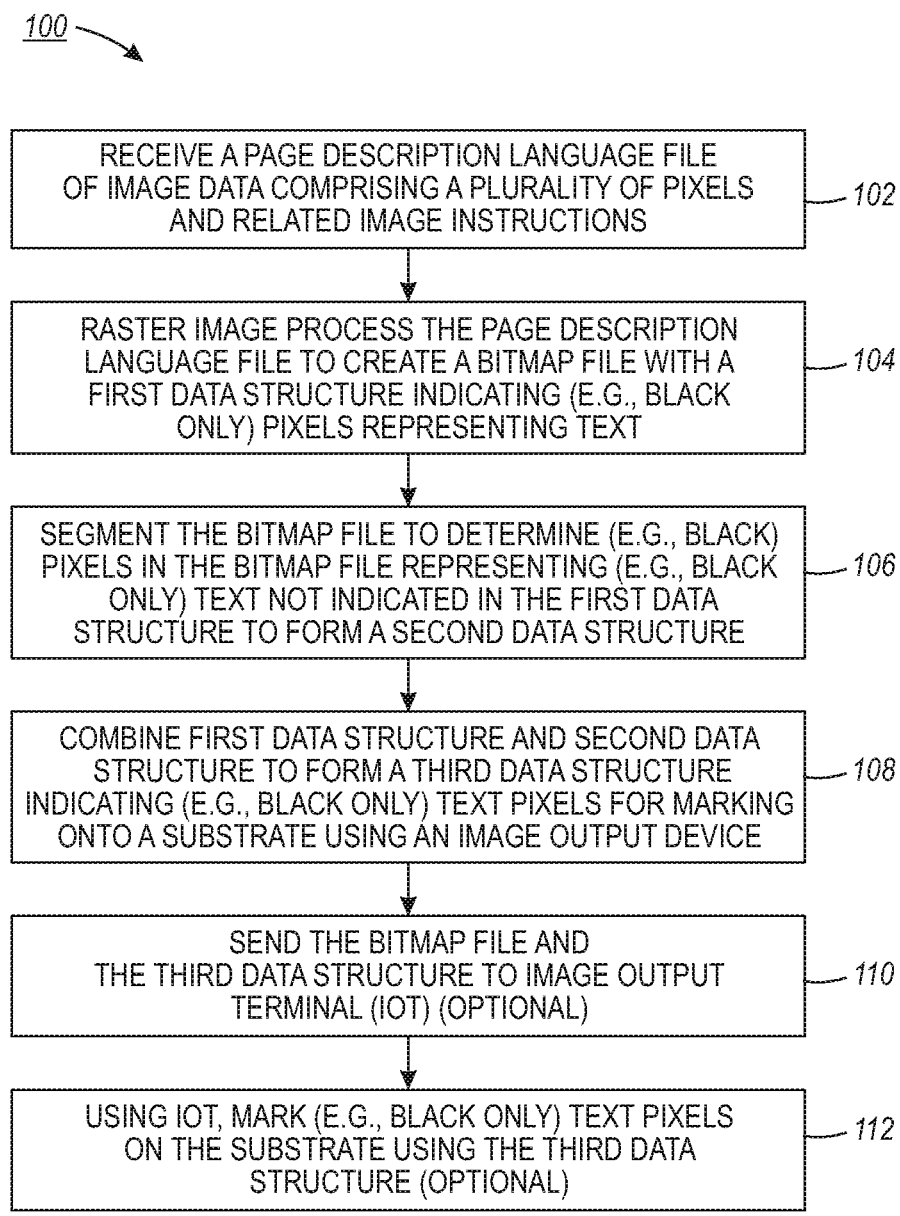
FIG. 1 illustrates a flow chart/block diagram illustrating a method for processing image data in accordance with an embodiment of the present disclosure.

According to one or more embodiments, a methodology is disclosed that determines text pixels of a predetermined colorant (e.g., of pure black color) for marking and output using marking materials (e.g., ink, toner, or other marking medium having any type of colorant). The determined text pixels can then be marked without mixing with other colors, thereby increasing text quality of the printed pixels on a substrate.

This disclosure uses algorithms, methods, and processing elements (e.g., hardware) in multi-function systems/devices to determine text pixels taking the above into consideration.

Throughout this disclosure, the term "pixel" as used herein is defined as a pictorial element of data that may be provided in any format, color space, or compression state which is associated with or readily convertible into data that can be associated with a small area or spot in an image that is printed or displayed. Generally, a pixel is defined in terms of value (or brightness or intensity) and its position in an image. A pixel may be associated with an array of other small areas or spots within an image, including a portion of an image, such as a color separation plane. Accordingly, the term "pixel location" is also used interchangeably herein with the term pixel to represent a pictorial element of image data as defined above. An image generally comprises a plurality of pixels or pixel locations having a number of components that contribute to defining the image when it is either printed or displayed.

As used herein, "device dependent" color space (or image data) means color schemes which are tied to or related to color production by a machine, such as printer, scanner or monitor. Typical device dependent color spaces, for example, include red-green-blue (RGB) or cyan-magenta-yellow-black (CMYK) color spaces. The color gamut is produced by a machine using different combination of these colors.

On the other hand, "device independent" color space (or image data), as used herein, means color schemes which are not tied to color production of a machine. Typical device independent color spaces include, for instance, sRGB, CIE XYZ, YCbCr, and CIE (L*, a*, b*) color spaces. No device is needed to produce these colors. Rather, the color space is related to human observation of color.

Additionally, as used herein, an "electronic image" includes machine- or computer-readable data for electronically reproducing an image. It includes any electronic media content that is intended to be used in an electronic form or transmitted to a marking engine to be printed. In some instances, the electronic image may be an electronic document. As used herein, "electronic document" means any electronic media content that is intended to be used in an electronic form or printed output. Pixels in an electronic document may be formatted as Red-Green-Blue (RGB), cyan-magenta-yellow-black (CMYK), a device-independent color space (e.g., CIE-LAB, YCrCb, XYZ, etc.), or other pixel data formats. Conversions from one color space to another may also be possible, for instance, as known in the art. Pixels in an electronic document may be formatted, in some instances, as binary image data. Binary image data is single bit or bi-level, with only two possible values. More particularly, pixel values may be either ON (e.g., value=1) denoting an active pixel, or OFF (e.g., value=0) denoting background and/or no presence of marking or color.

Exemplary electronic documents may include various digital image, text, and mixed content files, such as PDF, TXT, DOC, TIFF, BMP, GIF, JPEG, and other common page description language (PDL) file and document formats, such as Adobe® Postscript®. A page description language (PDL) is a method of describing printed pages in a printer independent format. A PDL establishes an interface between a print driver or client and a print server or printer. No one standard PDL presently exists, and as a result a number of industry standards have emerged. Accordingly, it should be understood that reference to a PDL image file and/or document throughout this disclosure may include any of the above-mentioned examples, or any other page description language not mentioned above.

With any PDL or other electronic image format/document, there will inevitably be a step of translation of the PDL or image format data into a form usable by at least an image output terminal (IOT) or an output device, such as a printer, a copier, or an MFD. In accordance with an embodiment, such a step may be implemented through raster image processing (RIP), also known as ripping. Generally, when a document is to be printed, image data representing a document is input into a device and processed in an image path. For example, image data comprising a plurality of pixels is received and processed along an image path of a processor or system. In some instances, if the image data is not already in independent color space then a step of converting the image data to a device independent color space may be optionally performed. As the image data is processed, a determination may be made to determine if the input image data comprises different types of pixels, including text. During conversion of a PDL file, however, image quality problems can occur if text is not recognized (e.g., during ripping). In such cases, text pixels can be sent within the raster image, but can sometimes result in low density, hole ridden printed text on the substrate. Accordingly, this disclosure describes a method for processing image data in order to more accurately identify pixels representing text (in an output document) so that image quality of the output document is improved.

Throughout this disclosure, reference to pixels "of a predetermined colorant" refers to pixels being defined by a color (or combination of colors) in an image for output onto a substrate. More specifically, this disclosure determines text pixels of a predetermined colorant in order to improve image quality. In an embodiment, text pixels of a predetermined colorant may refer to pixels represents by a single colorant. For example, as noted below, pure black pixels (K) may be the pixels of interest. Alternatively, text pixels marked in pure cyan (C), yellow (Y), or magenta (M) may be determined. In another embodiment, it may refer to pixels represented by more than one colorant. For example, pixels that are red, blue, or green may be determined. In yet another embodiment, the predetermined colorant may be determined based on a predetermined percentage or amount of color that is used for a text pixel. For example, a pixel of interest may be identified as a text pixel and comprising at least 50 percent (%) of a specific colorant. In the case of a single colorant, the predetermined percentage or amount would be 100%. Of course, such percentages are not meant to be limiting. The predetermined percentage that is used for determining text pixels of a predetermined colorant may be altered according to user preferences, for example. Accordingly, it should be understood that any number of colors and methods may be used in the determination of text pixels of a predetermined colorant.

Moreover, "colorant" refers to a marking material of color that is used for marking onto a substrate, such as paper. The colorant can be marked onto the paper by an output or marking device. Colorant and color may be used interchangeably throughout this disclosure with reference to analyzing image data and text pixels for marking/output. In the detailed description below, reference is made to a determination of pure black (i.e., K only) pixels representing text pixels of a predetermined colorant in an electronic image while processing image data for an output document. More specifically, the embodiments describe methods for processing and outputting at least pure black text to improve the output image quality of black text in the output document or substrate. Although throughout this disclosure reference is made in the description and in the Figures to determine at least black pixels for output as text (pure black (K) being the predetermined colorant), any of the noted embodiments and implementations shown in FIGS. 1-3 may be implemented for another separate marking material or another color or combination of colors, as will become further evident below.

FIG. 1 is a flow chart/block diagram illustrating a method 100 for processing image data in accordance with an embodiment of this disclosure. The method 100 may be implemented by one or more processors or systems, such as those illustrated in FIGS. 4 and 5 and further described below. It should be understood by one of skill in the art that image data of a page or document can be processed (along image path 400 in system 600, shown in FIGS. 4 and 5, for example) before execution of the method 100, although such processes are not discussed in detail herein. Method 100 comprises receiving a PDL file of image data comprising a plurality of pixels of image data and related image instructions at 102. Such related image instructions include methods and details for outputting (e.g., printing) the image data, such as formatting, for example, and are not meant to be limiting. At 104, the PDF file is processed using raster image processing (ripping) to create a bitmap file (which may comprise contone image data, for example). The bitmap file has a first data structure associated therewith indicating, among other things, at least black only pixels representing text. At 106, the ripped bitmap file is segmented to determine at least black pixels in the bitmap file representing black only text that were not indicated, identified, or determined in the first data structure. Segmenting the ripped bitmap file is used to determine or form a second data structure. Then, as shown at 108, the first data structure and the second data structure are combined to form a third data structure indicating black only text pixels for marking onto a substrate (using an image output device).

Optionally, at 110, the bitmap file (which includes information from the ripped image data) and the third data structure are sent to an image output device or image output terminal (IOT) for processing and output. At 112, during optional use of the IOT or the output device, black only text pixels are marked on the substrate using information indicated by the third data structure.

The "data structures" may be any type of electronic data associated with an electronic image data file that indicates elements and features of the image. The data structures may be configured to indicate feature(s) related to or associated with an image and/or its pixel locations through an identification or recognition process or algorithm. Any number or type of notation may be used, and the indication process is not limiting. For example, the data structures may be planes comprising information related to pixels. The planes may indicate a particular color or colors associated with a pixel location, for example, or the type of data a pixel location represents (e.g., type of pixel for output (text, background, contone), a color plane, a format plane, etc.) using a binary format, e.g., YES or NO. Each plane may indicate ON and OFF pixel locations (e.g., in a binary format, e.g., one (1) being "ON" and zero (0) being "OFF") based on what that particular plane represents.

In accordance with an embodiment, data structures may be binary tag planes. That is, tags may be used to indicate that a pixel location represents (or does not represent) text when output. In an embodiment, tags are placed on pixel locations that represent text. In another embodiment, a plurality of types of tags are placed on each pixel location, with each tag indicating or identifying the type of data (e.g., text, background, text on tint) represented by the pixel location. In another embodiment, tags may be used to represent text pixels of a predetermined colorant. The type, number, and use of tags, however, is not meant to be limiting.

Figure 2:
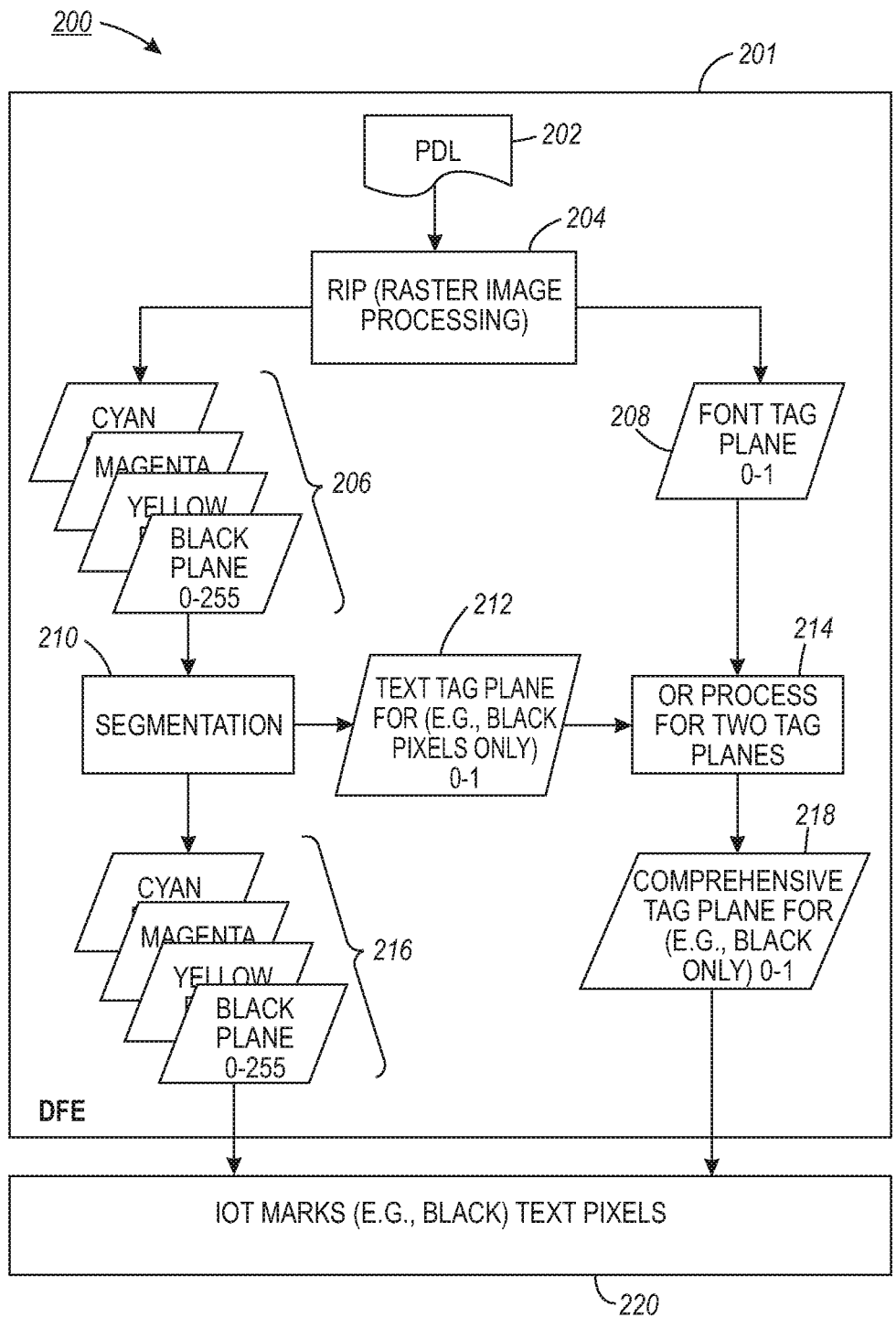
FIG. 2 illustrates a schematic representation of implementing the method of FIG. 1, in accordance with an embodiment.

FIG. 2 illustrates an exemplary schematic representation of a method 200 for implementing the method 100 of FIG. 1 using tag planes. As shown, PDL image data comprising a plurality of pixels and related image instructions is received/input at 202 and raster image processed, i.e., ripped, at 204. As a result, a bitmap file with a first data structure indicating black pixels representing text is provided. A first data structure may be a font tag plane generated at 208 as a result of the ripping at 204. For example, the font tag plane at 208 may be generated from the related image instructions received with PDL image data. The font tag plane is a binary tag plane indicating pixels as ON (e.g., one) or OFF (e.g., zero). In an embodiment, the font tag plane indicates pixels locations representing text as ON. The font tag plane may also include data or information for all colors/planes of pixels, e.g., C, M, Y, and/or K that represent text, for example.

The bitmap file indicates at least color planes for which pixel locations are associated therewith are also generated, as shown at 206. In order to more accurately identify at least the black only (K, or pure black) pixels representing text, the bitmap file of color planes (e.g., the CMYK planes) is processed using a segmentation method at 210. Segmenting the bitmap file at 210 determines color planes for which pixel locations are associated therewith, as shown at 216, as well as at least those black pixels in the bitmap file representing text not indicated in the first data structure. As a result, a second data structure in the form of a text tag plane is formed at 212. The text tag plane may, however, determine similar pixel locations determined in the first data structure, i.e., the font tag plane determined at 208. In accordance with an embodiment, the text tag plane indicates only pure black (K only) pixel locations. In another embodiment, the text tag plane indicates all pixel locations that represent text. The text tag plane is a binary tag plane indicating pixels as ON (e.g., one) or OFF (e.g., zero). In an embodiment, the text tag plane indicates pixels locations representing at least black text as ON.

The results from the font tag plane and text tag plane are then combined at 214. An "OR" process for the two tag planes is implemented at 214 to determine the pixel locations indicating at least black text. The combination of results resulting from the "OR" process increases the accuracy of the determination of (at least) black text pixels in the document by combining the determinations of the two planes at 208 and 212. Accordingly, in an embodiment, as a result of the combination a third data structure in the form of a comprehensive tag plane is formed at 218. The comprehensive tag plane is a binary tag plane indicating pixels as ON (e.g., one) or OFF (e.g., zero). In an embodiment, the text tag plane indicates pixels locations representing black text as ON (e.g., a value of one (1) indicates the presence of a text pixel and zero (0) corresponds to no font detected for the pixel). In another embodiment, the comprehensive tag plane indicates all pixel locations representing text as ON.

In an embodiment, the comprehensive tag plane may be the font tag plane of 208 that is altered and updated to include the results of the text tag plane. For example, for pixel locations where segmentation at 210 determines that text (e.g., of any color) is resident, tags will be added (if not already present due font tagging described above) to the comprehensive tag plane.

Thereafter, the segmented color planes at 216 and the comprehensive tag plane at 218 may be sent for output (e.g., to an output device/IOT) for output processing. In accordance with an embodiment, the tags of the comprehensive tag plane indicate to the output device to mark pure black (K only) pixels using black marking material. In another embodiment, the tags of the comprehensive tag plane indicate all pixel locations (of any color) representing text. In this case, the output device/IOT may be configured to identify pure black pixels (within the all of the tagged pixels representing text) that are text, and mark the black pixels on the substrate.

The method for segmenting the ripped bitmap file at 210 should not be limiting. Any number of known or future methods for segmenting image data may be implemented by this method. In an embodiment, the segmentation technology implemented by the processor(s) is an auto-windowing segmentation technique, configured to use a 2 pass methodology for analyzing pixels of image data by segmenting pixels/regions into classifications such as text, continuous tone, background, different halftone frequencies and text on tint classifications. The segmentation parameters can be tuned to the "clean" signal that the ripped image produces. As an example, one or more similar methods as disclosed in U.S. Pat. No. 6,347,153 B1 to Triplett et al., issued on Feb. 12, 2002, U.S. Pat. No. 6,181,829 B1 to Clark et al., issued on Jan. 30, 2001, U.S. Pat. No. 5,293,430 to Shiau et al., and U.S. Pat. No. 7,844,118 B1 to Li et al., each of which are assigned to the same assignee (Xerox Corporation) and are incorporated by reference in their entirety herein, may be used as a segmentation technique that is applied to the ripped bitmap image data. Accordingly, any number of methods may be used for the determination of the text tag plane at 212.

In an embodiment, segmentation is applied to the raster (ripped) image before (xm2) compression.

As shown in FIG. 2, the processing of the image data (including ripping and segmentation of the ripped image data) may be performed by one or more processing elements that are part of a device or system. In an embodiment, a print engine 201, which may include a print driver or print controller, produces a PDL file at 202 and processes it as shown from 204-218. More specifically, the print engine is noted as a digital front end (DFE) (i.e., processor(s)), which is typically used for processing the image data to generate an image. In an embodiment, the print engine/DFE 201 can implement the ripping and segmentation of the image data, as well as generation of the comprehensive tag plane for black text, and send both the processed image data and comprehensive tag plane to the output device/IOT for output (e.g., printing). The processor(s) or modules included in the DFE are not limiting. Further details regarding processing of the image data along an image path and an exemplary system are described below with reference to FIGS. 4 and 5, respectively.

Above it is noted that the output device is configured to mark pure black pixels using marking material (e.g., see 220 in FIG. 2). Because processing of such pixels by the output device/IOT can sometimes reduce output quality of text, in an embodiment, the IOT is configured to process (tagged) text pixels and output the same without correction or compensation processing that includes changing and/or manipulating the data that the pixel represents, e.g., its color. For example, in an embodiment, the output device/IOT may be configured to determine and mark text pixels without addition of other color(s) during marking on a substrate (e.g., paper), without lessening the determined density of marking material to be used (or by marking with a predetermined density), and/or without changing the color of the pixel for marking. In an embodiment, the output device/IOT is configured to apply a predetermined density of marking material (e.g., ink) to the substrate for text (e.g., pure black) pixels (versus the other color pixels). For example, in a case where determining and marking pure black text pixels are of interest, the predetermined density may be relatively higher density (e.g., about 90 to about 100%) for output black text pixels, as compared to other pixels of C, M, Y color, or pixels of a combination of C, M, Y, and/or K color. In an embodiment, the tagged pixels will not have ditherback (a lower level of ink density to enable covering up of missing ink jet image quality defects) applied.

However, it should also be understood that processing techniques performed by the IOT for marking and printing on a substrate that may take place for compatibility purposes, according to IOT settings, and the like. In an embodiment, the IOT may be configured to adjust the other colorant content and density setting (of the marking material) for the other pixels (e.g., pixels representing background, text on tint, etc.) so that the resultant output on the substrate will still yield high output image quality using the IOT, in addition to higher quality output text pixels. In another embodiment, the other color pixels representing text of C, M, Y (i.e., if only processing for black text pixels) may also be adjusted by the IOT.

Figure 3:
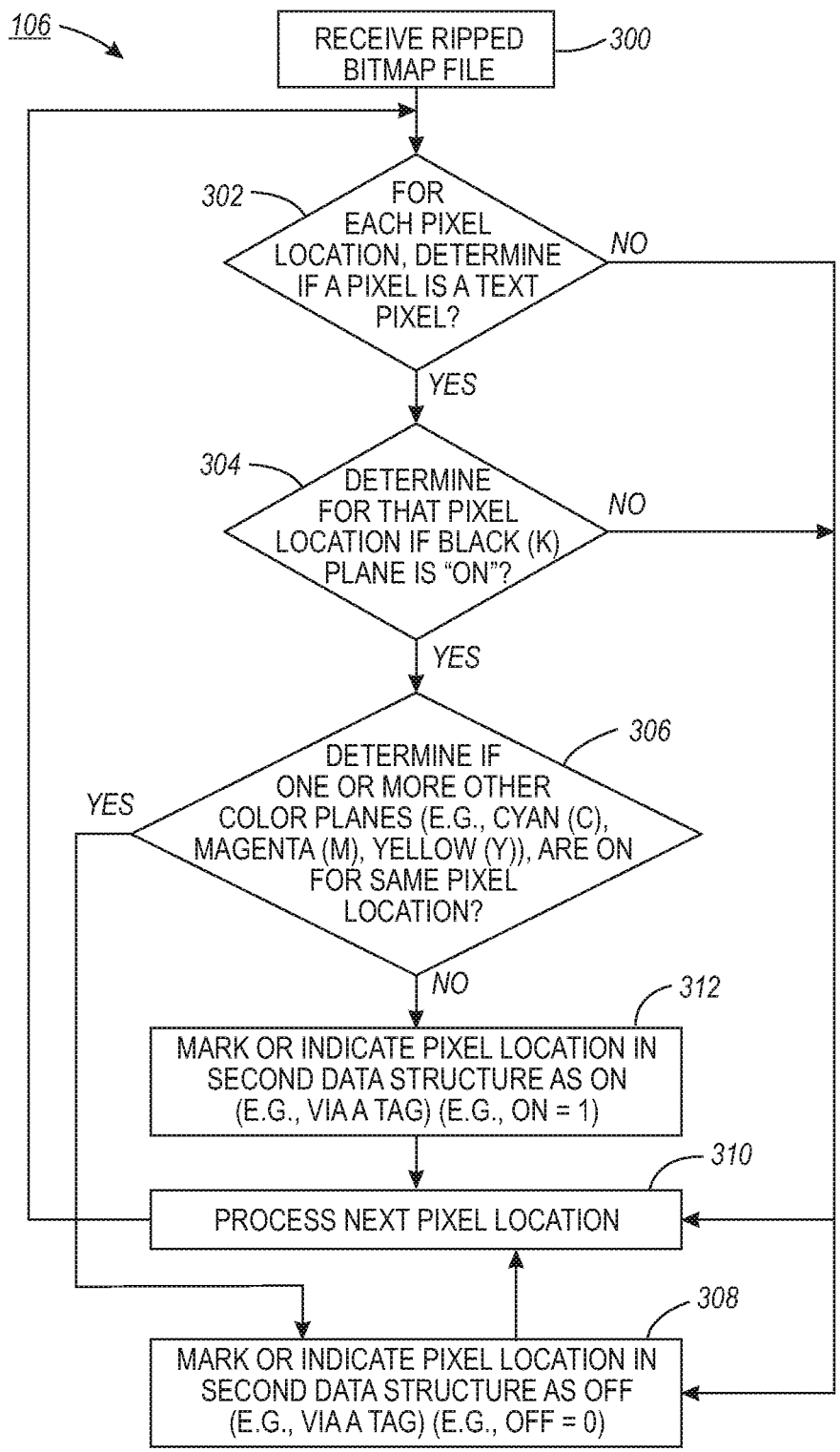
FIG. 3 illustrates an exemplary method of segmenting the rasterized image data as indicated in FIG. 1, in accordance with an embodiment.

With regards to a method for determining, for example, pixel locations that represent text pixels, any number of methods may be used. FIG. 3 illustrates one method that may executed as a segmentation technique at 106 in method 100 and configured to be implemented by a processor to determine at least pure black pixel locations for the text tag plane (e.g., at 212) (or second data structure).

At 300 the ripped bitmap file is received. Then, at 302, for each pixel location, it is determined if a pixel in the image data is a text pixel (e.g., using a segmentation technique, as noted above). If it is not a text pixel, i.e., NO, then the pixel location is indicated or marked (e.g., via a tag) in the third data structure at 308 as OFF (e.g., zero value).

If, however, at 302 it is determined that the pixel is a text pixel, i.e., YES, it is then determined at 304 for that pixel location if the black plane (K) is ON. If the black plane is not ON, i.e., NO, then the pixel location is indicated in the third data structure at 308 as OFF, as noted above. If the black plane is ON, i.e., YES, then at 306 it is determined if one or more other color planes (e.g., C, M, Y, K, are on for that same pixel location. If YES, then that pixel location is indicated in the third data structure at 308 as OFF (it is not a pure black pixel, if another color is mixed with the black).

However, if it is determined at 306 that none of the color planes are ON for that same pixel location, i.e., NO, then the pixel location is indicated or marked (e.g., via a tag) in the third data structure at 308 as ON (e.g., value of one).

After the indication/marking at 308 or 310, then at 310 the next pixel location is selected and then processed, beginning at the determination at 306. The method continues until all pixel locations are processed.

Again, any of the noted embodiments and implementations shown in FIGS. 1-3 may be implemented for another separate marking color or combination of colors. For example, for a CMYK marking device, the processor and/or system may be configured to determine any number of text pixels for marking and output using the above described methods and implementations for all text pixels, despite their color. In another embodiment, the processor and/or system may be configured to determine text pixels for marking and output using the above described methods and implementations for those text pixels with only cyan marking material, only magenta marking material, or only yellow marking material. Accordingly, in either embodiment, such indications may be made in the second data structure (e.g., tag plane) and combined with the ripped image data (into the third data structure) for output. In another embodiment, the output device/IOT may be configured to determine pixel locations representing text of one or more particular colors of predetermined colorants, and may be configured to mark such pixels on a substrate without adjustment (e.g., at a predetermined density).

In another embodiment, the processor and/or system may be configured to determine each text pixel configured for marking with a single (pure) color of marking material. For example, as noted, the processor and/or system may be configured to determine each pixel location representing text. In an embodiment, pixel locations of any single color (C, M, Y, or K) are determined, and, for each pixel location configured only to be marked with one color of marking material (i.e., with no other colors added), the processor/system can indicate such pixel locations are text pixels of pure color. Accordingly, such indications may be made in the second data structure (e.g., tag plane) and combined with the ripped image data (into the third data structure) for output.

In some embodiments, the above-described features of method 100 (including segmenting ripped image data) may be optionally implemented or requested by a customer for a specific device or system by selection (e.g., using a user interface (UI) or manual switch). For example, the customer or user may be prompted to invoke application and use of the method 100 in FIG. 1, or request use of method 100 (e.g., for a particular document, or for a particular device) before printing a document or before using the device. In an embodiment, for a machine that is configured to implement the method 100, the machine may have the described ripped segmentation shown in method 100 in a default "OFF" state (e.g., due to potential performance degradation and considerations). When a customer or user wishes to process his/her document/image using comprehensive (black) text image quality, the user may implement the method 100 by selecting (or switching) the setting of the machine. In another embodiment, the switch or selection to implement the method 100 may be available to operator(s) or supervisor(s) for a particular machine or server.

This feature as described by the method 100 can improve customer satisfaction with output documents. For example, it can improve changes to the electronic image in cases when text is inserted, or modified (e.g., as bit maps for reasons such as last minute corrections at bit map level), or when secure or legal text is inserted into the document, and the like. Generally, because it segments the raster image to determine any missing pixels that represent (black) text, the marked image has increased accuracy and output quality. Accordingly, problems such as skip pitches and holes in output text are reduced.

In some cases, processing of each job using method 100 may require more of the image data to be RIPped ahead before commitment to print, depending on the type of machine or device used for output. The number of sheets that may needed to be RIP processed before commitment to print a particular document can be raised. The change (delta Δ) in sheets that are raster image processing can be determined through testing, for example.

Figure 4:
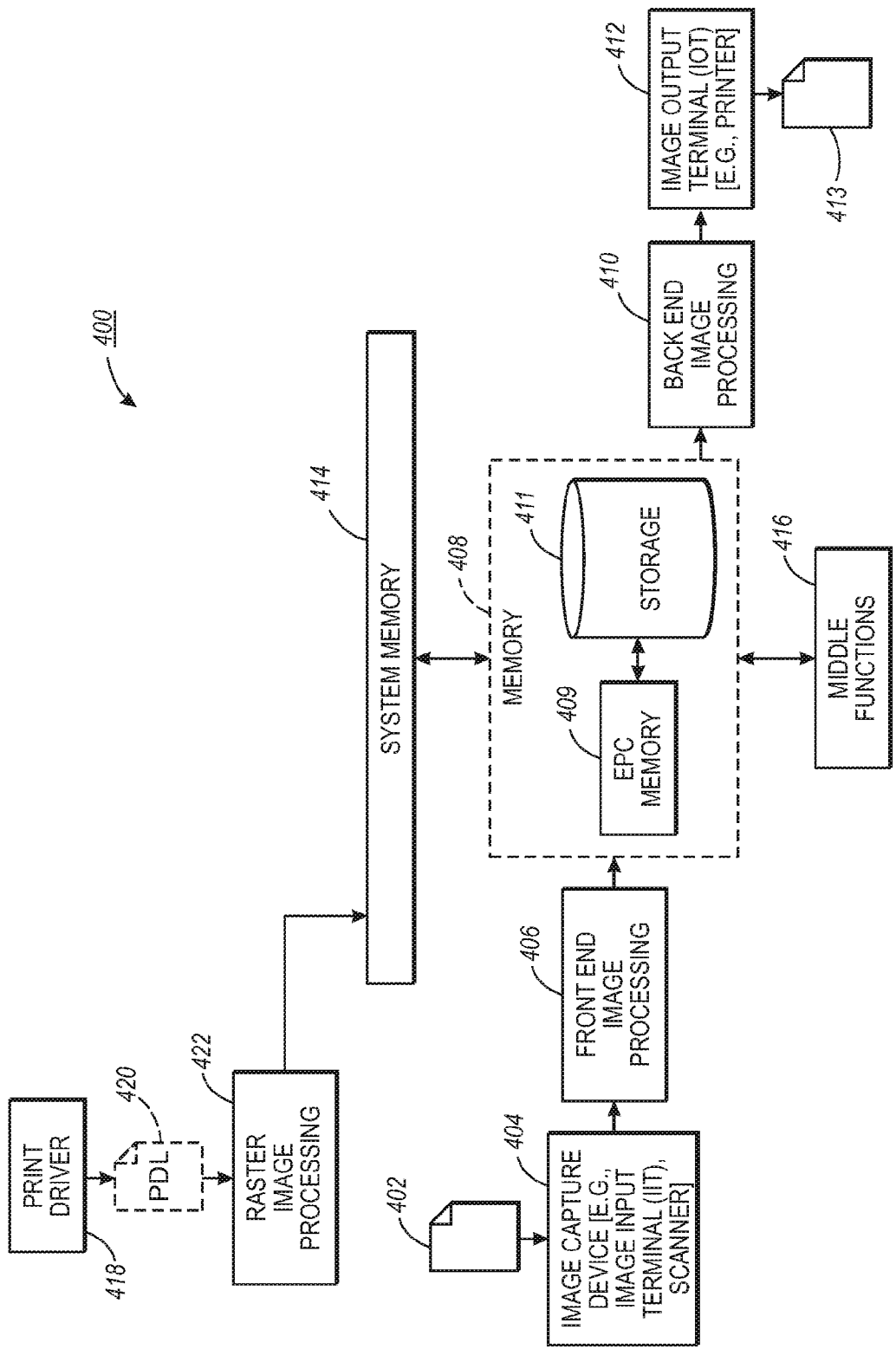
FIG. 4 illustrates an exemplary block diagram of an image path of a system, device, or image processing apparatus, in accordance with an embodiment, comprising at least one processor and an output device, for implementing the method of FIG. 1, in accordance with an embodiment.

FIG. 4 shows an example of a block diagram of a multi-function image path 400 used to handle concurrent operations for an image processing apparatus. More specifically, image path 400 is representative of one or more paths through which image data of an input document 402 or page, input into an image processing apparatus, may be processed using a plurality of processing elements (or modules) and then output. An example of such an apparatus may be a MFD, for example. The image path of the image processing apparatus or device comprises, among other devices, an image input terminal (IIT) 404, a processor or processing elements 406 and 410, a memory 409 and/or a storage device 411, and an image output terminal (IOT) 412 and/or marking engine interface (also referred to as a print engine). Generally, these elements (as will be generally described) of the device are provided to perform functions that assist in receiving image data such as a scanned document, configuring the image path of the processing elements 406 and 410 to process the image data, and outputting the image data. The image processing apparatus can comprise a plurality of image paths for manipulating image data of a document for output. One example includes printing a document using a print driver 418 according to a selected output mode of the image processing apparatus. However, it should be noted that the apparatus or device may comprise additional elements not described herein or alternative elements for performing similar functions, and should not be limited to those elements as illustrated in FIG. 4. Generally, the image path shown corresponds to any number of output modes that may be selected for an image processing apparatus. Further, with the herein disclosed method, existing image paths may be easily altered. For example, modules for implementing segmentation may already exist in the image path, or a separate segmentation module may be added to the image path for implementation after raster image processing of an input document, if so desired. The illustrated multifunction image path 400 for processing an electronic image is not limiting.

The IIT 404 is used to scan or acquire an input document or page into image data to be processed along the multifunction image path 400. The IIT 404 may be a digital scanner, for example. The scanner may capture image data as binary or contone image data. Generally, however, any device used to scan or capture the image data of a document is regarded and will be referred to as an IIT. For example, the image data may be captured by a scanner in a copier, a facsimile machine, a multi-function device, a camera, a video camera, or any other known or later device that is capable of scanning a document and capturing electronic image data. In some embodiments, IIT 404 may be connected to a network or telephone system, for example, to receive as input image data such as via a facsimile (fax) machine or computer (CPU). Input documents and/or image data may be received via a telephone number, an e-mail address, an Internet Protocol (IP) address, a server, or other methods for sending and/or receiving electronic image data.

A processor or plurality of processing elements 406, 416 and 410 for processing and/or manipulating image data using a plurality of operations and/or processes are also provided in the image paths. The description of the processing elements below provides an example of devices capable of implementing processes to be performed and should not be limiting. For example, additional processing elements may be provided along the image path 400. Alternatively, additional operations may be performed on the image data other than or in addition to those described with reference to FIGS. 1-3.

The multifunction image path 400 may comprise a plurality of image processing elements (or processors) and for manipulating image data received from the IIT 404 or other input devices using a plurality of operations and/or processes. The processing elements and may be a combination of image processing elements which comprise software and hardware elements that perform a number of operations on the image data received from the IIT 404 (or other source) using a set of parameters. The parameters are used to convert the images to the format desired as output (e.g., high quality) along the image path. The processing elements may be a part of a computer system or apparatus such as a xerographic system, a photocopier, a printing device, or MFD. For simplicity purposes, the term "processing element" throughout the application will refer to one or more elements capable of executing machine executable program instructions. It is to be understood that any number of processing elements may be used and that additional operations or processes besides those described below may be provided in an image path.

More specifically, the multifunction image path 400 comprises a front end processing element 406, a memory 409, storage 411, and a back end processing element 410. The front end processing element 406 is an image processing element that receives image data from the IIT 404 and is used to process the image data according to user preferences such that it may be stored and later retrieved for output. The back end processing element 410 is generally used at the end of an image path to retrieve stored image data (e.g., from memory 409, storage 411, or system memory 414) and to process the image data such that the image data may be output to a printing device as an accurate recreation of the original input or scanned image. Of course, processing elements may also be used for compression and/or decompression of image data.

Each of the image processing elements comprises an input and an output. Additionally, the system or apparatus may also include one or more controllers or routers (not shown) to select and route the image data between the processing elements 406 and 410 and memory 409, storage 411, and/or storage 414, for example.

Front end processing element 406 receives as input the image data from the IIT 404 and processes the image data along the image path. Front end processing element 406 may be used to process the image data as well as determine user-defined operations generally known in the art. For example, the front end processing element 406 may be used for color space conversion, reduction or enlargement, document registration, and/or performing other operations or processes on the image data.

Memory 409 and/or storage 411 may be used to store image data. For example, memory 409 and/or storage 411 may be used to temporarily store the original image data of document input via IIT 404. Converted (e.g., contone to binary image data) or compressed image data may also be stored in the memory 409 and/or storage 411. Memory 409 and/or storage 411 may be used to store machine readable instructions to be executed by the processor/processing elements. The memory 409 and/or storage 411 may be implemented using static or dynamic RAM (random access memory), a floppy disk and disk drive, a writable optical disk and disk drive, a hard disk and disk drive, flash memory, or the like, and may be distributed among separate memory components. The memory 409 and/or storage 411 can also include read only memory, or other removable storage drive(s) or memory devices. Additional description regarding computer or machine readable instructions and medium is described below with respect to FIG. 6.

System memory 414 may also be considered a main memory of the image processing apparatus. System memory 414 is used to run software associated with a controller, for example. System memory 414 may comprise, for example, a hard disk and drive which includes programs, image data, and the like that may be used for processing, etc. In some embodiments, system memory 414, memory 409, and/or storage 411 may be interchangeable or provided as a single device.

Generally, also associated with memory 409 and storage 411 is a device or program that is capable of encoding and decoding image data. For example, the image data may be processing by a plurality of coder-decoder pairs, i.e., CODEC, which is generally known in the art. Codec may be provided to perform any number of compression/decompression techniques on the image data including, but not limited to JPEG or JBIG2. A compressor and decompressor may use compression/decompression algorithms or other encoding/decoding methods, and should not be limiting.

The front end processing element 406 may communicate with memory 409 and/or storage 411 to store processed and/or compressed image data, for example. Compressed image data may be stored in memory 409 and/or storage 411 temporarily or for a later time when needed. When the image data is needed or it is time for marking (e.g., using the marking engine interface/IOT 412 or printing device), the image data may be retrieved from memory 409, storage 411, and/or storage 414 via the back end processing element 410 to be exported, for example.

In some embodiments, the multifunction image path 400 may also include a middle functions processing element 416 which may be used to perform some additional image data manipulation. Middle functions element 416 may be used for middle function operations including, but not limited to, rotation, annotation, and merging, and for compressing and/or decompressing image data for output, for example. The middle functions processing element 416 may communicate with memory and/or storage to store processed and/or compressed image data, for example. The input and output of image data to the middle functions processing element 416 depends on the selectively chosen image path or output mode. In some embodiments, middle functions processing element 416 may receive and store image data in PDL format or intermediate image format (IIF). The middle functions element 416 may also process and format image data for exporting out on a network, such as PDF, TIFF, or JPEG file formats, or for a fax device. Nonetheless, the functions performed by middle functions processing element 416 should not be limiting.

Back end processing element 410 receives processed image data retrieved from the memory 409 or storage 411. Back end processing element 410 may be used to further render the image data for output. For example, back end processing element 410 may be used to convert the color space of the processed image data (e.g., convert from device independent color space such as standard RGB (sRGB) or CIE L*a*b color space to device dependent CMYK color space), provide color balance, further rendering, filtering, and/or other operations or processes to prepare the images for marking. Subsequently, the back end processing element 410 may be used to decompress the image data and output the image data to the IOT 412. The output of processed image data from the back end processing element 410 depends on the image path or selected output mode.

In an embodiment, the processed image data may be directly output to the marking engine interface or IOT 412 for printing using a printer/MFD. The IOT 412 or marking engine interface may be associated with a printer or MFD which is used for printing documents. The IOT or marking engine interface is used to output the processing image data to the printer for a copy or print job. The IOT 412 or marking engine interface may further perform image processing on the image data to make corrections or compensate for deviation in the printing process. Alternatively, the back end processing element 410 may be used to perform further image processing on the image data.

The IOT 412 outputs processed image data to the printer or apparatus to complete the scan image path, for example. Of course, the algorithms and processes used by the elements in the image path shown in FIG. 4 should not be limiting. Any number of data compression algorithms (e.g., lossless, lossy), decompression algorithms, color conversion algorithms (e.g., contone to binary, binary to grayscale, etc.) and the like may be performed to provide a high quality output document 413 (in addition to the method 100 of FIG. 1).

With regard to a print image path implementing the method 100 of FIG. 1, one possible print operation comprises a print driver 418 (also referred to as a print controller). Documents may be sent to print driver 418, for example, through a network interface and/or user interface (UI). The print controller 410 accepts content for digital images desired to be printed in any one of a number of possible page description language (PDL) formats. The print driver 418 is used to manage print devices, e.g., color laser printers, production printers, and digital presses, especially in high-volume environments. The print controller 410 may be a part of the printing device itself or an external device, such as a personal computer (PC) or server, or other digital device comprising software, that interfaces to a network and will accept image content and process the image content for copier or printer devices. In one embodiment, the print driver 418 may be a digital front end (DFE). Printer driver 418 produces a PDL (Page Description Language) file 420 for printing via an IOT 412. Printer controller 418 may interpret, convert or, in some cases rasterize input print data (if a raster image processor is included therein) in the form of a page description language (e.g., PostScript, PCL), markup language (e.g., XML) or other special document format or language into a formatted language or instructions that IOT 412 can understand.

The PDL file is processed by a Raster Image Processing element (RIP) 422 to produce formatted image data capable of being further processed before compression and marking. The RIP 422 may be located within an output device itself or externally implemented as hardware, software, or a combination. As an example, RIP 422 may be implemented in a software application or device driver. A RIP 422 may also reside within printer driver 418, in an embodiment. Examples of raster image processing operations may include image and graphics interpretation, rasterization, scaling, segmentation, color space transformation, image enhancement, color correction, halftoning, compression etc.

Typically a ripped image is used for rendering by a print engine or IOT 412. However, in accordance with this disclosure, the ripped image is further processed to produce at least greater image quality of text in the output document. Specifically, the pixels of ripped image data are processed using method 100 in FIG. 1 to classify and/or determine pixels representing text in the output document. After processing via method 100, the electronic image data can be compressed for storage in the system memory 414, storage 411, and/or memory 409, before being output for marking to IOT 412.

Then, the input to the IOT 412 is a rasterized bitmap file that is generated by a combination of the raster image processed image data (which may include any related instructions) and results of the subsequent segmentation performed on the image data (e.g., see FIG. 2). The IOT 412 may further perform image processing to make corrections or compensation to correct for deviations in the printing process. However, as described in detail above, for those pixel locations that are noted in the third data structure, e.g., via tags, such correction or compensation processing may be limited for tagged text pixels, so that the pixels are marked without substantial adjustment.

Generally, any suitable printing apparatus may be employed to implement method 100 and to comprehensively identify and mark black text pixels in a document. The marking materials of this disclosure can be used in or applied by an image processing apparatus configured to generate an ink-based (e.g., solid ink) or toner-based image on a substrate. For example, the printing apparatus may be a machine that incorporates a plurality of marking material applicators, stations, or housings, such that color marking materials (e.g., cyan, magenta, yellow, and black, or CMYK) may be housed therein for application to the substrate.

The herein described embodiments may be used in inkjet device, such as, for example, a solid inkjet printer, an aqueous inkjet printer, or a UV inkjet printer, or they may be used in an electrophotographic printing system or a lithographic printing system.

Figure 5:
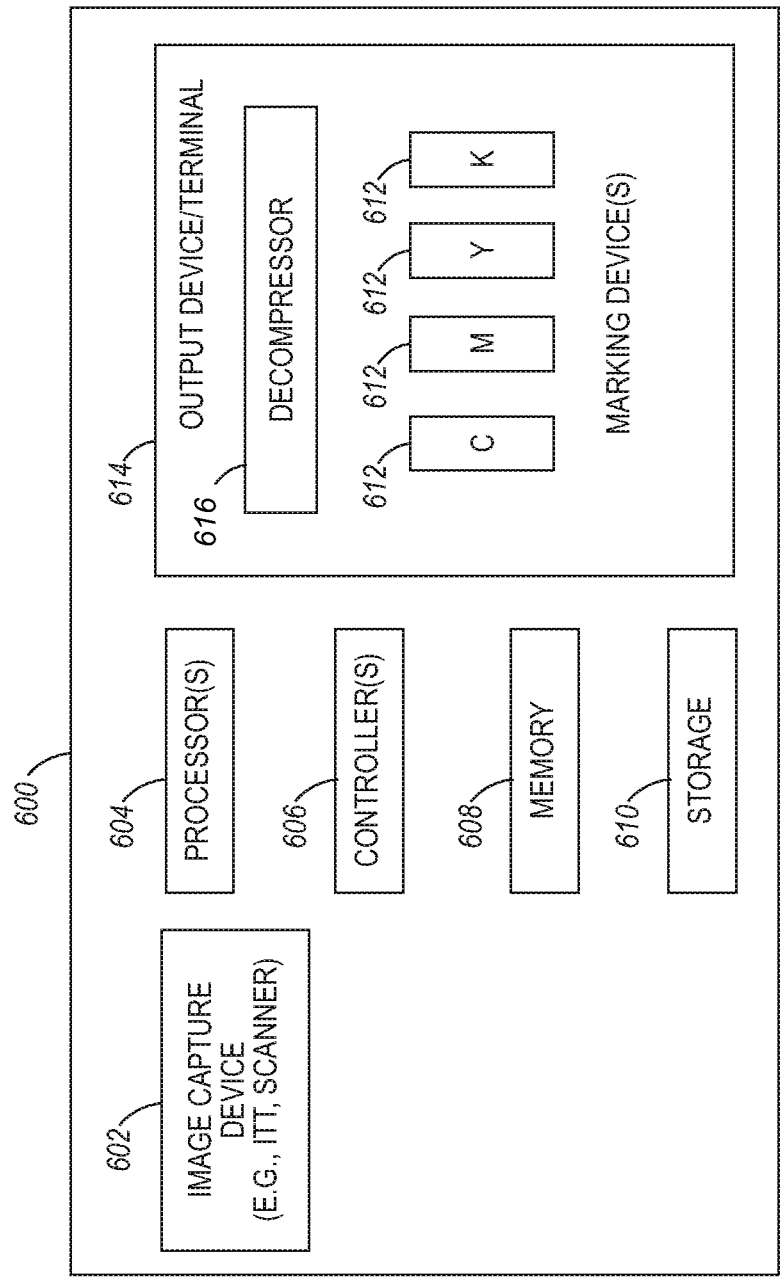
FIG. 5 illustrates a block diagram of a system, device, or image processing apparatus for implementing the method of FIG. 1, in accordance with an embodiment.

For explanatory purposes only, FIG. 5 is a block diagram illustrating an exemplary printing apparatus 600 that may be used in accordance with an embodiment for outputting documents processed using the method 100 of FIG. 1. The illustrated elements of apparatus 600 of FIG. 5 may be a part of a computer system, device, or apparatus such as a xerographic system, a photocopier, a printing device, or a multi-function device (MFD). In an embodiment, the apparatus 600 may be a phase change or solid or UV-cured ink jet printing system, or electrophotographic printing system.

For example, the apparatus 600 may comprise an image capture device 602, at least one processor 604, a controller(s) 606, memory 608 and/or storage 610, marking devices 612, and an output device 614. Each of the devices shown in system 600 may also be considered modules, and, therefore, the terms "device" and "module" are used interchangeably herein. The devices or modules illustrated in FIG. 5 (further described below) are not meant to be limiting. It is to be understood that any number of elements or modules may be used (e.g., more or less modules may be used and/or combined) and that additional operations or processes besides those described below may be provided. FIG. 4 (described above) illustrates an exemplary image path for processing image data according to method 100 using such devices or modules, which may be included in system 600.

Generally, some of devices or modules shown in FIG. 5 are known by those of skill in the art and are therefore not discussed in great detail herein. Moreover, FIGS. 4 and 5 show similar devices and it should be understood that the above description for the features in the image path of FIG. 4 applies to the features in FIG. 5. The features in FIG. 5 are designed to show a system incorporating the basic elements used to process and mark the image data (e.g., through an image path 400 as shown in FIG. 4).

For example, the image capture device 602 is configured to provide and/or receive image data, much like the described input device or IIT 404. At least one processor 604 or processing element is configured to process pixels of the image data in order to process image data for output. Controller 606 may be used to direct or control any number of modules or devices in system 600. The at least one processor 604 may be instructed by one or more controllers 606 to process the image data that is provided or received. The processor or processing element may be a combination of image processing elements or modules which comprise software and hardware elements that may perform a number of operations on the image data received from the image capture device 602 using a set of parameters (e.g., processors 406, 416, and 410 of FIG. 4). The parameters may be used to convert the images to the format desired as output (e.g., high quality) along an image path.

When images are called for marking, they may be called out of memory 608 or storage 610 and subsequently processed and/or decompressed. A decompressor 616 may be used to restore the compressed data using any algorithm for reversing the used compression algorithm, so that the image data comprises the segmented and ripped image data and comprehensive tag plane information.

An output device 614 may be provided to optionally output the image data (e.g., as noted in the method 100 at 112) (upon cue). Output device 614 may be any type of device that is designed to output the image data, e.g., IOT 412. In an embodiment, the output device 614 may decompress the image data and information before output. In some embodiments, decompressor 616 is provided in output device 614 of system 600 to decompress image data before outputting the image data with output device 314, if needed. The decompressor 616 and output device 614 may be the same module, or separate modules.

The marking devices 612 are applicators, stations, printheads, or housings incorporated into the output device 614 of the apparatus 600 used to mark or apply marking materials, such as color (CMYK) inks for printing image data of a document and a composite security element thereon. In an embodiment, controller 606 is used to control one or more marking devices or applicators 612 of system 600. Any number of marking applicators 612 may be used.

The processor 604, marking device(s) 612, and/or other associated modules of the apparatus 600 illustrated in FIG. 5 may be used to perform or implement the non-limiting steps 102-112 as described in method 100 of FIG. 1, for example. These steps may or may not include the implementations illustrated in FIGS. 2 and 3. The system 600 may also process image data using modules shown in the image path 400 of FIG. 4.

As briefly mentioned above, other embodiments include incorporating the above methods into a set of computer executable instructions readable by a computer and stored on a data carrier or otherwise a computer readable medium, such that the method 100 (in FIG. 1)—as well as method 200 and 300—is automated. In a possible embodiment, the methods may be incorporated into an operative set of processor executable instructions configured for execution by at least one processor. FIGS. 1, 2 and 3 show flow charts of such computer readable instructions that may be implemented by one or more processing elements/processors. For example, in some embodiments, memory 608 or storage 610 is configured to store non-transitory computer executable instructions such that when the executable instructions are executed by a computer or processor 604, and cause a computer or processor to automatically perform a method (e.g., method 100) for processing image data for outputting documents. In embodiments of the present disclosure, the processor(s), for example, may be made in hardware, firmware, software, or various combinations thereof. The system 600 may be a computer system which includes a bus or other communication mechanism for communicating information, and one or more of its processing elements may be coupled with the bus for processing information. Also, the machine-readable instructions may be stored in various mechanisms for storing and/or transmitting information in a form that may be read by a machine (e.g., a computing device). For example, a machine-readable storage medium may comprise RAM or other dynamic storage devices (a floppy disk and disk drive, a writable optical disk and disk drive (CD-ROM), a hard disk and disk drive, flash memory, or the like), and may be distributed among separate memory components. Storage device 610 may include read only memory (ROM) or other static storage device coupled to the bus to store executable instructions for the processor or computer. Alternatively, another storage device, such as a magnetic storage disk or optical storage media, may also be coupled to the bus for storing information and instructions. Such devices are not meant to be limiting. In an embodiment, a machine-readable transmission media may include forms of propagated signals, including carrier waves, infrared signals, digital signals, and other media for transmitting information. While firmware, software, routines, or instructions may be described in the above disclosure in terms of specific exemplary aspects and embodiments performing certain actions, it will be apparent that such descriptions are merely for the sake of convenience and that such actions in fact result from computing devices, processing devices, processors, controllers, or other devices or machines executing the firmware, software, routines, or instructions.

In alternative embodiments, hard-wired circuitry may be used in place of or in combination with software instructions to implement the disclosure. Thus, embodiments of this disclosure are not limited to any specific combination of hardware circuitry and software. Any type of computer program product or medium may be used for providing instructions, storing data, message packets, or other machine readable information associated with the method 100, 200, and/or 300. The computer readable medium, instructions, or product should not be limiting.

In addition, it should be noted that the system/apparatus 600 may include a local display or control panel user interface (UI) that allows a customer to read input, instructions, and features for processing image data. The user interface may be used to alternatively set the system or to select to implement the method 100 of FIG. 1, previously described. The location and accessibility of the features on the display/control panel interface should not be limiting. For example, a user may scroll through a list of processing features by accessing them directly on the machine or on a computer.

While the principles of the disclosure have been made clear in the illustrative embodiments set forth above, it will be apparent to those skilled in the art that various modifications may be made to the structure, arrangement, proportion, elements, materials, and components used in the practice of the disclosure.

While this disclosure has been described in connection with what is presently considered to be the most practical and preferred embodiments, it is to be understood that it is capable of further modifications and is not to be limited to the disclosed embodiments, and this disclosure is intended to cover any variations, uses, equivalent arrangements or adaptations of the inventive concepts following, in general, the principles of the disclosed embodiments and including such departures from the present disclosure as come within known or customary practice in the art to which the embodiments pertains, and as may be applied to the essential features hereinbefore set forth and followed in the spirit and scope of the appended claims.

It will be appreciated that various of the above-disclosed and other features and functions, or alternatives thereof, may be desirably combined into many other different systems/devices or applications. Various presently unforeseen or unanticipated alternatives, modifications, variations, or improvements therein may be subsequently made by those skilled in the art which are also intended to be encompassed by the following claims.

What is claimed is:

1. A processor-implemented method for processing image data in an image processing apparatus, the image processing apparatus comprising at least one processor for processing documents containing image data comprising a plurality of pixels, the method comprising the following acts implemented by the at least one processor:

receiving a page description language file of image data comprising a plurality of pixels and related image instructions;

raster image processing the page description language file to create a bitmap file with a first data structure indicating at least pixels representing text of a predetermined colorant;

segmenting the bitmap file to determine at least pixels in the bitmap file representing text of the predetermined colorant not indicated in the first data structure to form a second data structure, and combining the first data structure and the second data structure to form a third data structure indicating text pixels of the predetermined colorant for marking onto a substrate using an image output device.

2. The method according to claim 1, wherein the first data structure is a binary tag plane indicating pixels representing text of the predetermined colorant as "ON".

3. The method according to claim 1, wherein the second data structure is a binary tag plane indicating pixels representing text of the predetermined colorant as "ON".

4. The method according to claim 1, wherein the third data structure is a comprehensive binary tag plane indicating a combination of the pixels representing text of the predetermined colorant from the first data structure and the second data structure, and, wherein the combining comprises, for each pixel of the image data, if at least one of the first data structure or the second data structure indicates that a pixel represents text of the predetermined colorant, then indicating in the third data structure that the pixel is a text pixel of the predetermined colorant.

5. The method according to claim 1, wherein the predetermined colorant is pure black, and wherein segmenting determines black pixels in the bitmap file representing pixels to be marked with pure black marking material, and wherein the combining determines black pixels in the third data structure.

6. The method according to claim 1, wherein the segmenting comprises, for each pixel:
  determining if a pixel in the bitmap file is a text pixel;
  determining if the text pixel is a black text pixel;
  determining if the pixel location also includes one or more additional color planes for output, and wherein
  if the pixel is a determined black text pixel and without output in one or more additional color planes, then, indicating that pixel location as "ON" in the second data structure to represent a pure black text pixel,
  else indicating that pixel location as "OFF" in the second data structure.

7. The method according to claim 1, wherein the image processing apparatus further comprises an image output device configured to output image data, and wherein the method further comprises sending the bitmap file and the third data structure to the image output device.

8. The method according to claim 7, wherein the output device comprises marking devices for marking pixels with marking materials, and wherein the method further comprises marking pixels with marking materials onto the substrate using the marking devices based on the third data structure and the related image instructions.

9. The method according to claim 1, wherein the predetermined colorant is selected from the group consisting of: pure cyan (C), pure magenta (M), pure yellow (Y), pure black (K).

10. The method according to claim 1, wherein the predetermined colorant is selected based on a text pixel comprising at least a predetermined percentage of an amount of a particular colorant.

11. A system for processing image data having a plurality of pixels comprising at least one processing element, the at least one processing element comprising an input and an output and configured to receive and process pixels of the image data, the at least one processing element configured to:
  receive a page description language file of image data comprising a plurality of pixels and related image instructions;
  raster image process the page description language file to create a bitmap file with a first data structure indicating at least pixels representing text of a predetermined colorant;
  segment the bitmap file to determine at least pixels in the bitmap file representing text of the predetermined colorant not indicated in the first data structure to form a second data structure, and
  combine the first data structure and the second data structure to form a third data structure indicating text pixels of the predetermined colorant for marking onto a substrate using an image output device.

12. The system according to claim 11, wherein the first data structure is a binary tag plane indicating pixels representing text of the predetermined colorant as "ON".

13. The system according to claim 11, wherein the second data structure is a binary tag plane indicating pixels representing text of the predetermined colorant as "ON".

14. The system according to claim 11, wherein the third data structure is a comprehensive binary tag plane indicating a combination of the pixels representing text of the predetermined colorant from the first data structure and the second data structure, and, wherein the combining by the at least one processing element comprises, for each pixel of the image data, if at least one of the first data structure or the second data structure indicates that a pixel represents text of the predetermined colorant, then indicating in the third data structure that the pixel is a text pixel of the predetermined colorant.

15. The system according to claim 11, wherein the predetermined colorant is pure black, and wherein segmenting by the at least one processing element determines black pixels in the bitmap file representing pixels to be marked only with black marking material.

16. The system according to claim 11, wherein the segmenting by the at least one processing element comprises, for each pixel:
  determining if a pixel in the bitmap file is a text pixel;
  determining if the text pixel is a black text pixel;
  determining if the pixel also includes one or more additional color planes for output, and wherein
  if, for that pixel location, the pixel is a determined black text pixel and without output in one or more additional color planes, then, indicating that pixel location as "ON" in the second data structure to represent a pure black text pixel,
  else indicating that pixel location as "OFF" in the second data structure.

17. The system according to claim 11, wherein the system further comprises an image output device configured to output image data, and wherein the at least one processing element is configured to send the bitmap file and the third data structure to the image output device.

18. The system according to claim 17, wherein the output device comprises marking devices for marking pixels with marking materials, and wherein marking devices are configured to mark pixels with marking materials onto the substrate using the marking devices based on the third data structure and the related image instructions.

19. The system according to claim 18, wherein the predetermined colorant is selected from the group consisting of: pure cyan (C), pure magenta (M), pure yellow (Y), pure black (K).

20. The system according to claim 11, wherein the predetermined colorant is selected based on a text pixel comprising at least a predetermined percentage of an amount of a particular colorant.

21. A non-transitory computer readable medium having stored computer executable instructions, wherein the computer executable instructions, when executed by a computer, direct a computer to perform a method for processing image data, the method comprising:
  receiving a page description language file of image data comprising a plurality of pixels and related image instructions;

raster image processing the page description language file to create a bitmap file with a first data structure indicating at least pixels representing text of a predetermined colorant;

segmenting the bitmap file to determine at least pixels in the bitmap file representing text of the predetermined colorant not indicated in the first data structure to form a second data structure, and combining the first data structure and the second data structure to form a third data structure indicating text pixels of the predetermined colorant for marking onto a substrate using an image output device.

22. The medium according to claim 21, wherein the first data structure is a binary tag plane indicating pixels representing text of the predetermined colorant as "ON".

23. The medium according to claim 21, wherein the second data structure is a binary tag plane indicating pixels representing text of the predetermined colorant as "ON".

24. The medium according to claim 21, wherein the third data structure is a comprehensive binary tag plane indicating a combination of the pixels representing text of the predetermined colorant from the first data structure and the second data structure, and, wherein the combining comprises, for each pixel of the image data, if at least one of the first data structure or the second data structure indicates that a pixel represents text of the predetermined colorant, then indicating in the third data structure that the pixel is a text pixel of the predetermined colorant.

25. The medium according to claim 21, wherein the predetermined colorant is pure black, and wherein the segmenting determines black pixels in the bitmap file representing pixels to be marked only with black marking material.

26. The medium according to claim 21, wherein the segmenting comprises, for each pixel:
 determining if a pixel in the bitmap file is a text pixel;
 determining if the text pixel is a black text pixel;
 determining if the pixel also includes one or more additional color planes for output, and wherein
 if, for that pixel location, the pixel is a determined black text pixel and without output in one or more additional color planes, then, indicating that pixel location as "ON" in the second data structure to represent a pure black text pixel,
 else indicating that pixel location as "OFF" in the second data structure.

27. The medium according to claim 21, wherein the image processing apparatus further comprises an image output device configured to output image data, and wherein the method further comprises sending the bitmap file and the third data structure to the image output device.

28. The medium according to claim 27, wherein the output device comprises marking devices for marking pixels with marking materials, and wherein the method further comprises marking pixels with marking materials onto the substrate using the marking devices based on the third data structure and the related image instructions.

29. The medium according to claim 28, wherein the predetermined colorant is selected from the group consisting of: pure cyan (C), pure magenta (M), pure yellow (Y), pure black (K).

30. The medium according to claim 21, wherein the predetermined colorant is selected based on a text pixel comprising at least a predetermined percentage of an amount of a particular colorant.

* * * * *